United States Patent
Koshel et al.

(10) Patent No.: US 11,910,104 B2
(45) Date of Patent: Feb. 20, 2024

(54) ALL-IN-FOCUS IMAGER AND ASSOCIATED METHOD

(71) Applicant: ARIZONA BOARD OF REGENTS ON BEHALF OF THE UNIVERSITY OF ARIZONA, Tucson, AZ (US)

(72) Inventors: John Koshel, Tucson, AZ (US); Emma Landsiedel, Tucson, AZ (US)

(73) Assignee: ARIZONA BOARD OF REGENTS ON BEHALF OF THE UNIVERSITY OF ARIZONA, A BODY CORPORATE, Tucson, AZ (US)

( * ) Notice: Subject to any disclaimer, the term of this patent is extended or adjusted under 35 U.S.C. 154(b) by 235 days.

(21) Appl. No.: 17/594,458

(22) PCT Filed: Apr. 19, 2020

(86) PCT No.: PCT/US2020/028901
§ 371 (c)(1),
(2) Date: Oct. 18, 2021

(87) PCT Pub. No.: WO2020/215050
PCT Pub. Date: Oct. 22, 2020

(65) Prior Publication Data
US 2022/0210321 A1    Jun. 30, 2022

Related U.S. Application Data

(60) Provisional application No. 62/836,410, filed on Apr. 19, 2019.

(51) Int. Cl.
*H04N 23/80*    (2023.01)
*G01B 11/24*    (2006.01)
*G03B 13/34*    (2021.01)

(52) U.S. Cl.
CPC ......... *H04N 23/80* (2023.01); *G01B 11/2441* (2013.01); *G03B 13/34* (2013.01)

(58) Field of Classification Search
CPC ............ G01B 11/0608; G01B 11/2441; G01B 9/0203; G01B 9/0209; G02B 27/0075;
(Continued)

(56) References Cited

U.S. PATENT DOCUMENTS 3,614,235 A    10/1971    Munnerlyn
5,488,323 A    1/1996    Beacham, Jr. et al.
(Continued)

OTHER PUBLICATIONS

PCT Application No. PCT/US2020/028896, International Search Report and Written Opinion, dated Jul. 2, 2020, 17 pages.
(Continued)

*Primary Examiner* — Amy R Hsu
(74) *Attorney, Agent, or Firm* — Cozen O'Connor

(57) ABSTRACT

A method for imaging of an object includes, for each of a plurality of surface-regions of the object, determining a corresponding image-sensor pixel group of a camera illuminated by light propagating from the surface-region via a lens of the camera. The method also includes, after the step of determining and for each surface-region: (i) changing a distance between the object and the lens such that the surface region intersects an in-focus object-plane of the camera and the lens forms an in-focus surface-region image on the corresponding image-sensor pixel group; (ii) capturing, with the corresponding image-sensor pixel group, the in-focus surface-region image of the surface-region; and (iii) combining the in-focus surface-region images, obtained by performing said capturing for each surface-region, to yield an all-in-focus image of the object.

20 Claims, 4 Drawing Sheets

(58) Field of Classification Search
CPC .... G03B 13/34; H04N 23/671; H04N 23/676; H04N 23/80
See application file for complete search history.

(56) References Cited

U.S. PATENT DOCUMENTS

| | | | |
|---|---|---|---|
| 8,780,334 | B1 | 7/2014 | De Groot |
| 9,282,304 | B1 | 3/2016 | Schmit et al. |
| 2004/0146189 | A1 | 7/2004 | Langan |
| 2005/0259265 | A1 | 11/2005 | De Lega |
| 2006/0285122 | A1 | 12/2006 | Bankhead et al. |
| 2007/0075255 | A1 | 4/2007 | Xu |
| 2008/0024865 | A1 | 1/2008 | Koch et al. |
| 2008/0215271 | A1 | 9/2008 | Bankhead et al. |
| 2010/0053415 | A1 | 3/2010 | Yun |
| 2010/0128283 | A1* | 5/2010 | Liesener .............. G01B 9/0209 359/370 |
| 2011/0018592 | A1 | 1/2011 | Kimura et al. |
| 2011/0134312 | A1 | 6/2011 | Tay |
| 2011/0181888 | A1 | 7/2011 | Abdulhalim et al. |
| 2012/0007977 | A1* | 1/2012 | Yamamoto ......... G02B 27/0075 348/79 |
| 2013/0215299 | A1* | 8/2013 | Imamura .............. G02B 5/1885 348/272 |
| 2013/0321581 | A1* | 12/2013 | El-Ghoroury .......... G02B 30/27 348/340 |
| 2014/0125776 | A1* | 5/2014 | Damaskinos ........ G02B 21/365 348/50 |
| 2014/0146325 | A1 | 5/2014 | Tabuchi |
| 2014/0168660 | A1 | 6/2014 | Yan et al. |
| 2014/0226150 | A1 | 8/2014 | Colonna |
| 2015/0326772 | A1* | 11/2015 | Kazami .................. H04N 23/75 348/252 |
| 2017/0126950 | A1 | 5/2017 | Sarkar et al. |
| 2017/0363741 | A1* | 12/2017 | Send ..................... G01S 7/4816 |
| 2018/0316871 | A1 | 11/2018 | Yoshino |
| 2018/0352199 | A1 | 12/2018 | Hwang et al. |
| 2019/0137265 | A1 | 5/2019 | Boulanger et al. |
| 2021/0203907 | A1 | 7/2021 | Murase |

OTHER PUBLICATIONS

PCT Application No. PCT/US2020/028901, International Search Report and Written Opinion, dated Sep. 17, 2020, 11 pages.
U.S. Appl. No. 17/594,457 Notice of Allowance dated Sep. 13, 2023, 12 pages.

* cited by examiner

ALL-IN-FOCUS IMAGER AND ASSOCIATED METHOD

CROSS-REFERENCE TO RELATED APPLICATIONS

This application claims priority to U.S. provisional patent application Ser. No. 62/836,410, filed on Apr. 19, 2019, the disclosure of which is incorporated herein by reference in its entirety.

BACKGROUND

The extent of three-dimensional information captured in a two-dimensional image is dependent on the amount of detail that can be captured laterally and in depth. Lateral information increases with higher resolution systems, where smaller features can be distinguished. This increase in resolution is achieved by using a fast optical system, which requires a low F/#. Depth information increases with larger depth of focus, where more features at different depths can all be in focus at once. This depth resolution is achieved with a slow optical system, requiring a high F/#. Therefore, having high resolution and large depth of focus traditionally becomes a trade-off, where both cannot be achieved at once.

To address the inherent limits, there have been many extended depth of focus (EDOF) systems that attempt to keep high resolution laterally while increasing the depth of focus. Such systems include plenoptic cameras, phase masking, compressed imaging, scanning as in confocal microscopy, or interferometry.

Existing EDOF imaging technologies including plenoptic cameras, phase masks, compressed imaging, and confocal microscopy.

Plenoptic cameras use microlens arrays to capture many sub-images. The user can adjust focus and depth of focus after these many images are captured. Phase masks modify the clear aperture of an imaging system, which changes the shape of its point spread function in a specific, expected way. These changes provide additional scene information in the final image.

Compressed imaging requires less data than is traditionally needed to achieve an image of the same final size. Confocal microscopy is similar to traditional microscopy, but limits imaging from point to point rather than the full field of view. The microscope can focus at a specific point at a specific depth, thus imaging this point very well at the sensor. The microscope is scanned over the full field and through full depth, creating a stack of two-dimensional slices used to create a single in-focus image over the entire depth.

SUMMARY OF THE EMBODIMENTS

Existing EDOF imaging technologies systems, while attempting to circumvent the theoretical limitations, bring forth other issues, including artifacts in final images (e.g., phase masks and compressed imaging), significant post-processing (e.g., plenoptic cameras, phase masking, and compressed imaging), slow operation (e.g., scanning, confocal microscopy, and interferometry), and inability to collect true-color images (e.g., traditional interferometry). Simply, in the attempt to circumvent theoretical limitations in traditional optical imaging (i.e., tradeoff between resolution and depth of field), other issues arise such that to achieve both resolution and depth of field simultaneously has been challenging. What is needed are fast, repeatable, and cost-efficient imaging techniques that achieve high resolution over an extended depth of field. To this end, embodiments disclosed herein employ white-light interferometric imaging to capture all-in-focus images.

In a first aspect, a method for all-in-focus imaging of an object is disclosed. The method includes, for each of a plurality of surface-regions of the object, determining a corresponding image-sensor pixel group of a camera illuminated by light propagating from the surface-region of the object via a lens of the camera. The method also includes, after the step of determining and for each surface-region: (i) changing a distance between the object and the lens such that the surface region intersects an in-focus object-plane of the camera and the lens forms an in-focus surface-region image on the corresponding image-sensor pixel group; (ii) capturing, with the corresponding image-sensor pixel group, the in-focus surface-region image of the surface-region; and (iii) combining a plurality of in-focus surface-region images, obtained by performing said capturing for each of the plurality of surface-regions, to yield an all-in-focus image of the object.

In a second aspect, an all-in-focus imager includes a camera, an interferometer, a second beamsplitter, and an actuator. The camera includes an image sensor. The interferometer includes a reference sensor having a plurality of reference-sensor pixels, a reference mirror terminating a reference arm of the interferometer, and a first beamsplitter. The first beamsplitter is configured to split, at a first beam-splitting interface, an input light beam into (i) a test optical-beam propagating from the first beam-splitting interface to an object, such that the object terminates a test arm of the interferometer and reflects the test optical-beam as a reflected optical-beam, and (ii) a reference beam propagating from the first beam-splitting interface to the reference mirror and from the reference mirror to the reference sensor. The second beamsplitter is configured to direct (i) a first part of the reflected optical-beam to the reference sensor and (ii) a second part of the reflected optical-beam to the camera. The actuator is configured to change a length of the test arm by moving the object.

DETAILED DESCRIPTION OF THE EMBODIMENTS

Figure 1:
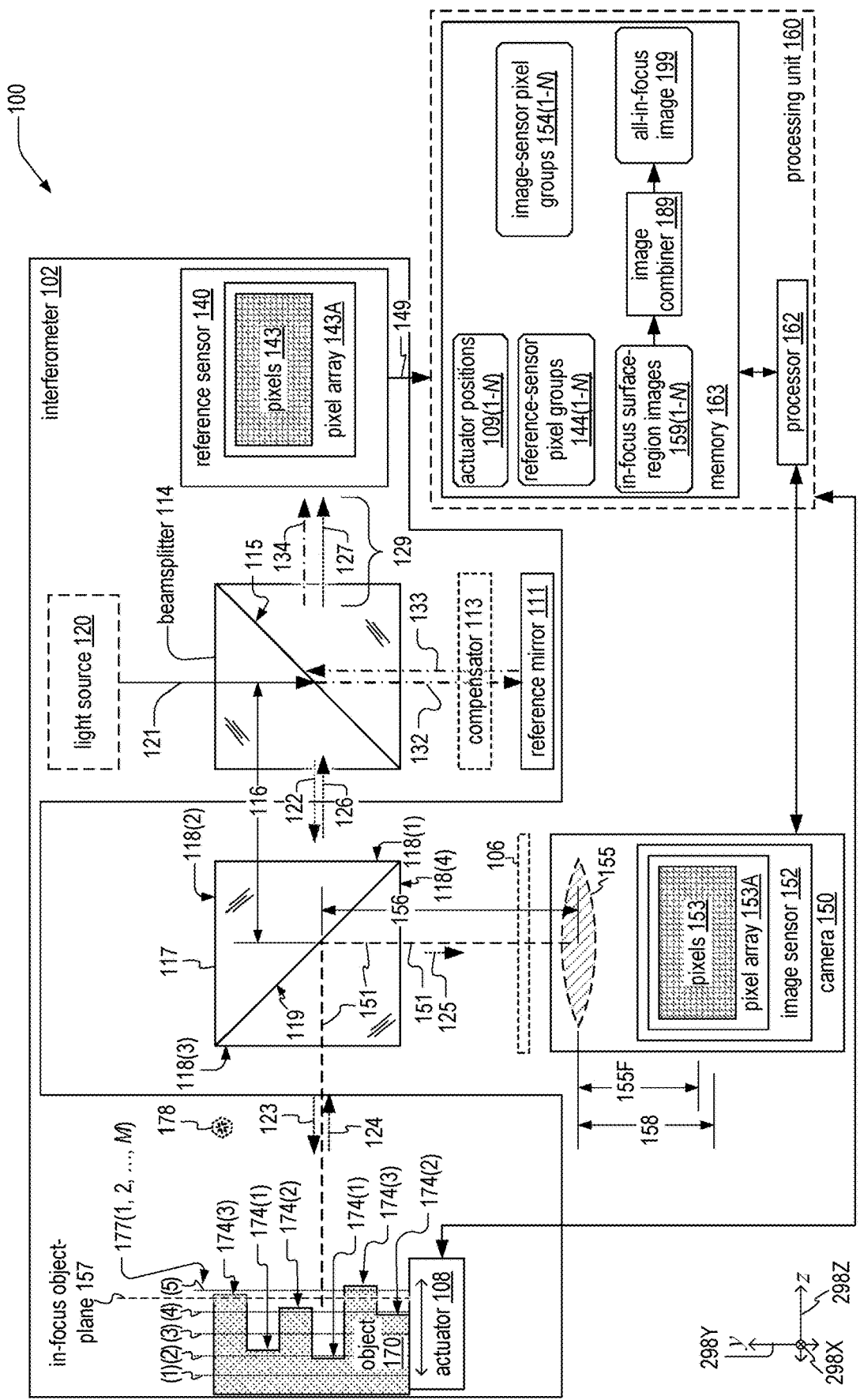
FIG. 1 is a schematic block diagram of an all-in-focus imager, in an embodiment.

FIG. 1 is a schematic block diagram of an all-in-focus imager 100 that includes a camera 150, an interferometer 102, a beamsplitter 117, and an actuator 108. In embodiments, all-in-focus imager 100 includes a processing unit 160. All-in-focus imager 100 is configured to generate an all-in-focus image of a surface 174 of an object 170 having a plurality of surface regions 174(k) at different respective distance ranges from camera 150. Interferometer 102 enables mapping each surface region 174(k) to a respective group of image sensor pixels of camera 150, after which each surface region 174(k), one by one, may be brought into focus of camera 150 to have its image captured by the respective group of image sensor pixels of camera 150. Since the mapping between surface regions 174(k) and corresponding image sensor pixel groups is obtained prior to image capture, it is known, for each surface region 174(k), which pixels of camera 150 provides in-focus image data. All-in-focus imager 100 therefore overcomes the deficiencies of prior-art systems by quickly capturing true-color and artifact-free images that have both high resolution and a long depth of field while not requiring significant post-processing or computational overhead.

The cross-sectional view of FIG. 1 is parallel to a plane, hereinafter the y-z plane, formed by orthogonal axes 298Y and 298Z, each of which is orthogonal to an axis 298Z. Herein, the x-y plane is formed by orthogonal axes 298X and 298Y, and planes parallel to the x-y plane are referred to as transverse planes. Also, a transverse direction refers to one or both of axes 298X and 298Y.

Camera 150 includes a lens 155 configured to form an image on a pixel array 153A of an image sensor 152. Pixel array 153A includes a plurality of pixels 153, each of which belongs to a respective one of a plurality of image-sensor pixel groups 154. Beamsplitter 117 includes a beam-splitting interface 119, which may be a surface of beamsplitter 117, or a material interface of two surfaces of beamsplitter 117 when beamsplitter 117 is a beamsplitter cube as in the example depicted in FIG. 1. FIG. 1 denotes a principal axis 151, which corresponds to the optical path of an optical ray propagating along the optical axis of lens 155A and reflecting off of beam-splitting interface 119 toward object 170. In embodiments, pixel array 153 is in a plane that is parallel to the x-z plane and perpendicular to principal axis 151.

Lens 155 (e.g., its principal plane) and a light-sensing surface of pixel array 153A are separated by an image-distance 158 along an optical axis of lens 155. Lens 155 has a focal length 155F such that camera 150 forms an in-focus image of objects in an in-focus object-plane 157, which is located at an in-focus object-distance $d_{157}$ from lens 155 along principal axis 151. In-focus object-distance $d_{157}$, image-distance 158, and focal length 155F may satisfy the Gaussian lens formula.

Interferometer 102 includes a reference sensor 140, a reference mirror 111, and a beamsplitter 114. Reference sensor 140 has a pixel array 143A that includes a plurality of reference-sensor pixels 143, each of which belongs to a respective one of a plurality of reference-sensor pixel groups 144, as determined in part by surface 174. Beamsplitter 114 has a beam-splitting interface 115. Interferometer 102 has a reference arm that begins at beam-splitting interface 115 and ends at reference mirror 111. In embodiments, interferometer 102 includes a compensator 113 between beamsplitter 114 and reference mirror 111 for compensating for dispersion and optical-path-length changes imposed by beam splitter 117 in the test arm of interferometer 102. In embodiments, pixel array 143 is in a plane parallel to the x-z plane.

In embodiments, all-in-focus imager 100 also includes at least one beam-shaping optical element, such as a lens, a tube lens for example. For example, all-in-focus imager 100 may include at least one of a first beam-shaping optical element between object 170 and beamsplitter 117, and a second beam-shaping optical element between reference sensor 140 and beamsplitter 114, and a third beam-shaping optical element between reference mirror 111 and beamsplitter 114

In embodiments, processing unit 160 includes software, stored in memory 163, that determines reference-sensor pixel groups 144 from a sensor output 149 generated by reference sensor 140. In embodiments, processing unit 160 also includes software, stored in memory 163, that determines image-sensor pixel groups 154 from reference-sensor pixel groups 144.

Beamsplitter 114 is configured to split, at beam-splitting interface 115, an input light beam 121 into a test optical-beam 122 and a reference beam 132. Reference mirror 111 retro-reflects reference beam 132 back to beamsplitter 114 as reflected beam 133, which beamsplitter 114 reflects as reference beam 134, which is detected by reference sensor 140. Test optical-beam 122 propagates from beam-splitting interface 115 to object 170.

In embodiments, all-in-focus imager 100 includes a light source 120 configured to generate input light beam 121. In embodiments, light source 120 includes a Kohler illumination source, and input light beam 121 is Kohler illumination that completely and uniformly illuminates surface 174. In embodiments, light source 120 is a low-coherence source, for example light beam 121 may have a coherence length less than ten micrometers. Examples of light source 120 include a tungsten lamp, a mercury lamp, a continuous-output xenon lamp, a superluminescent diode, and any combination thereof.

FIG. 1 denotes a plurality of object planes 177(1, 2, ..., M), where M is a positive integer greater than one, each of which is displaced from and parallel to in-focus object-plane 157. For clarity of illustration, M=5 in the illustration of object 170 in FIG. 1. A distance between adjacent planes 177 may greater than or equal to a step size of actuator 108 in direction 298Z. In embodiments, the step size of actuator 108 is between twenty nanometers and fifty nanometers.

In embodiments, a separation between adjacent object planes 177 is greater than or equal to a depth of field of camera 150. This enables camera 150 to capture an in-focus image of each surface region 174 as actuator 108 scans object 170 in the z direction such that each object plane 177 is coplanar with in-focus object plane 157 at a respective time during the scan. That is, while scanning, object planes 177 move with object 170. When the depth of field of camera 150 exceeds a separation between two adjacent object planes, planes 177(1) and 177(2) for example, capturing two respective images when planes 177(1) and 177(2) are coplanar with in-focus plane 157 is not necessary.

Object 170 has a front surface 174, located in a field of view of camera 150, that includes the plurality of surface regions 174(1, 2, ..., N), where N is a positive integer greater than one. In the example shown in FIG. 1, front surface 174 has surface regions 174(1-3). Herein, front surface 174 refers to the surface of object 170 that includes all of surface regions 174(1, 2, ..., N). In some scenarios, at least one of surface regions 174(k) is discontiguous. Herein k is an integer in the range of one to N.

All locations within each surface region 174 are closest to the same one of object planes 177. In the example of FIG. 1, each of surface regions 174(1) is closest to object plane 177(2), each of surface regions 174(2) is closest to object plane 177(4), and each of surface regions 174(3) is closest to object plane 177(5). Parts of a surface region 174 may be on opposite sides of its closest object plane 177. For example, FIG. 1 denotes two surface regions 174(1) that are on opposite sides of object plane 177(2).

The coherence length of light beam 121 determines a depth resolution of all-in-focus imager 100. If this coherence length exceeds a spacing between two adjacent object planes 177, all-in-focus imager 100 cannot distinguish between surface regions 174 that are closest to the adjacent object planes 177. Accordingly, in embodiments, the coherence length of light beam 121 is less than the separation between adjacent object planes 177.

Interferometer 102 has a test arm that begins at beam-splitting interface 115 and ends at front surface 174. The test arm hence has different lengths according to which surface region 174 it intersects.

Beamsplitter 117 is configured to direct part of test optical-beam 122 to front surface 174 as a test-optical beam 123. Front surface 174 reflects test optical-beam 122 as a reflected test-beam 124, which propagates from front surface 174 to a beam-splitting interface 119 of beamsplitter 117. Beamsplitter 117 is configured to direct (i) a first part of reflected test-beam 124 to reference sensor 140 and (ii) a second part of reflected test-beam 124 to camera 150.

Beamsplitter 117 includes four ports 118(1-4). When beamsplitter 117 is a beamsplitter cube, each port 118 is a respective surface of beamsplitter 117 perpendicular to the y-z plane. When beamsplitter 117 is not a beamsplitter cube, and is a plate beamsplitter for example, ports 118(1,2) correspond to two perpendicular planes on a first side of beam-splitting interface 119 such that the two planes and interface 119 form a right triangle with interface 119 as the hypotenuse. Similarly, ports (3,4) correspond to two perpendicular planes on a second side of beam-splitting interface 119 such that the two planes and interface 119 form a right triangle with interface 119 as the hypotenuse. In the example of FIG. 1, beamsplitter 117 transmits reflected test-beam 124 through port 118(1) as a reflected test-beam 126, part of which is transmitted by beamsplitter 114 as a detected test-beam 127 that is incident on pixel array 143A of reference sensor 140. Both reference beam 134 and detected test-beam 127 are incident on pixel array 143A, and form a recombined beam 129.

Beamsplitter 117 reflects reflected test-beam 124 through port 118(4) as a beam 126125, which is incident on pixel array 153A of camera 150. Actuator 108 is configured to change a length of the test arm by moving object 170. In the example of FIG. 1, actuator 108 is configured to move object 170 along the z axis.

In an alternative example, the orientation of beamsplitter 117 is rotated by ninety degrees, as compared to the configuration shown in FIG. 1, and the positions of object 170 and camera 150 are switched from their positions shown in FIG. 1. In such a rotated configuration, port 118(3) is between beam-splitting interface 119 and camera 150, and port 118(4) is between beam-splitting interface 119 and object 170. In such embodiments, beam-splitting interface 119 reflects a first part of test-optical beam 122 as beam 125 propagating toward object 170, and transmits a second part of test-optical beam 122 as test optical beam 123, which propagates toward camera 150. In such embodiments, actuator 108 is configured to move object 170 along the y axis.

A key characteristic of a beamsplitter is its split ratio, which is the ratio of reflected power R to transmitter power T. In the configuration of FIG. 1, beamsplitter 117 may have a splitting ratio less than one-half such that it transmits more of incident light than it reflects to ensure that the respective amplitudes of beams 127 and 134 are comparable, within a factor of two for example. Maintaining such a split ratio results in adequate fringe visibility in combined beam 129. In embodiments, beamsplitter 117 has a split ratio R/T between 20/80 and 40/60. In the above-mentioned rotated configuration, beamsplitter 117 may have a split ratio between 80/20 and 60/40.

In embodiments, an optical path length 116 between beam-splitting interface 119 and beam-splitting interface 115 equals an optical path length 156 along the section of principal axis 151 between beam-splitting interface 119 and lens 155. Optical path length 116 traverses a geometric path that is collinear with the section of principal axis 151 between beam-splitting interface 119 and surface 174. When reference sensor 140 detects interference in recombined beam 129 (between detected test-beam 127 and reference beam 134) at a reference-sensor pixel group 144(k), this interference corresponds to reflected test-beam 124 reflected by surface-region 174(k).

In embodiments, reference sensor 140 is an event-based vision sensor. Gallego et al. describe a key difference between event-based vision sensor and a traditional image sensor, or a camera with a traditional image sensor. Event-based vision sensors "work radically different from traditional cameras. Instead of capturing images at a fixed rate, they measure per-pixel brightness changes asynchronously. This results in a stream of events, which encode the time, location and sign of the brightness changes" ("Event-based Vision: A Survey," arXiv:1904.08405v2). An advantage of reference sensor 140 being an event-based vision sensor is that such a sensor can more accurately detect interference (e.g., interference fringes) between detected test-beam 127 and reference beam 134 as actuator 108 scans object 170 along the z axis.

Herein, detection of interference between 127 and 134 refers to detection of interference-induced changes in amplitude of recombined beam 129, e.g., as actuator 108 moves object 170, resulting from interference between beams 127 and 134. Interference includes at least one of constructive interference, destructive interference, and interference fringes corresponding to transitions between constructive and destructive interference. In embodiments, as actuator 108 translates object 170, the magnitude of the interference fringes (peak modulation between constructive and destructive interferences) associated with a surface region 174(k) increases from zero to a peak value, and back to zero, thus forming a correlogram. Detected interference may refer to a peak magnitude of the modulation (peak of the correlogram's envelope), and actuator position 109(k) corresponds the position of actuator 108 resulting in the detection of said peak magnitude.

Processing unit 160 includes a processor 162 and a memory 163 communicatively coupled thereto. Processing unit 160 is communicatively coupled to both reference sensor 140 and camera 150. In embodiments, processing unit 160 is also communicatively coupled to actuator 108 and configured to control actuator 108 to move object 170 to locations corresponding to a plurality of actuator positions 109(1-N), stores in memory 163.

In embodiments, memory 163 also stores the following measurement outputs indexed by 1-N corresponding to each actuator position 109: reference-sensor pixel groups 144(1-N), a plurality of sensor outputs 149(1-N), a plurality of in-focus surface-regions images 159(1-N), and an all-in-focus image 199. Memory 163 also stores computer-readable instructions, such as an image combiner 189.

Memory 163 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 163 may be integrated into processor 162.

In embodiments, memory 163 stores non-transitory computer-readable instructions that, when executed by processor 162, control processor 162 to control actuator 108 to vary the length of the test arm of interferometer 102, for example moves object 170 along the z axis to vary the length of the test arm.

In embodiments, all-in-focus imager 100 includes a flash 178, which may be located between beamsplitter 117 and object 170, located between camera 150 and beam-splitting interface 119, and/or be part of camera 150. Flash 178 is configured to illuminate object 170 when camera 150 captures an image of a surface region 174 thereof. Illuminating object 170 with flash 178 at other times, when camera 150 is not capturing an image, can interfere with the functioning of all-in-focus imager 100. For example, reference sensor 140 may detect illumination from flash 178 while also detecting interference in recombined beam 129 would hamper accurate determination of reference-sensor pixel groups 144.

In embodiments, all-in-focus imager 100 includes a spatial light modulator 106 along principal axis 151, for example, between beamsplitter 117 and camera 150. When capturing each in-focus surface-region image 159(k), processing unit 160 may control spatial light modulator 106 to transmit only parts of beam 125 that reach pixels 153 that are part of image-sensor pixel groups 154(k).

Figure 2:
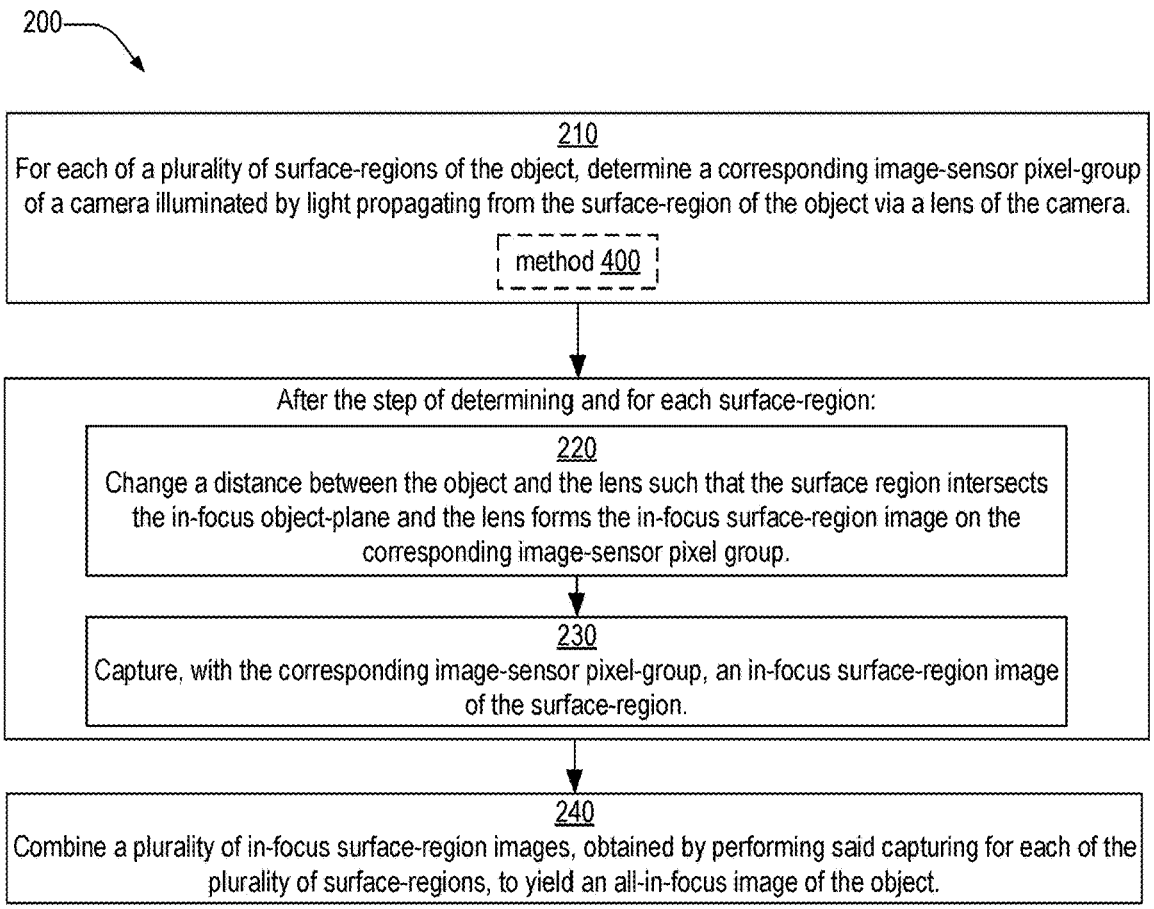
FIG. 2 is a flowchart illustrating a method for producing an all-in-focus image of an object, in an embodiment.

FIG. 2 is a flowchart illustrating a method 200 for producing an all-in-focus image of an object. Method 200 includes at least one of steps 210, 220, 230, and 240. Method 200 may be implemented within one or more aspects of all-in-focus imager 100. In embodiments, method 200 is implemented by processor 162 executing computer-readable instructions stored in memory 163.

Step 210 includes, for each of a plurality of surface-regions of the object, determining a corresponding image-sensor pixel group of a camera illuminated by light propagating from the surface-region of the object via a lens of the camera. In embodiments, all locations within each surface region are closest to a same respective object plane of a plurality of object planes each displaced from and parallel to an in-focus object-plane of the camera. In an example of step 210, all-in-focus imager 100 determines, for each surface region 174(k) of object 170, a corresponding image-sensor pixel group 154(k) of camera 150. Camera 150 is illuminated by beam 125.

Steps 220 and 230 occur after step 210 and for each surface region of the plurality of surface regions. In the following examples, the plurality of surface regions are surface regions 174.

Step 220 includes changing a distance between the object and the lens such that the surface region intersects the in-focus object-plane and the lens forms an in-focus surface-region image on the corresponding image-sensor pixel group. In an example of step 220, actuator 108 changes a distance between object 170 and lens 155 by moving object 170 along principal axis 151 such that, when actuator 108 is at an actuator position 109(k), surface region 174(k) intersects in-focus object-plane 157 and lens 155 forms an in-focus surface-region image on image-sensor pixel group 154(k). In embodiments, processing unit 160 stores actuator position 109(k) in memory 163.

Step 230 includes capturing, with the corresponding image-sensor pixel group, the in-focus surface-region image of the surface-region. In an example of step 230, camera 150 captures, with image-sensor pixel group 154(k), an in-focus surface-region image 159(k). In embodiments, memory 163 stores in-focus surface-region image 159(k).

Steps 220 and 230 are repeated for each surface region 174, such that memory 163 stores a plurality of actuator positions 109(1−N) and a corresponding plurality of in-focus surface-region images 159(1−N). Each in-focus surface-region image 154(k) has been captured at a respective actuator position 109(k), where k is an integer in the range of 1 to N.

Step 240 includes combining a plurality of in-focus surface-region images, obtained by performing said capturing for each of the plurality of surface-regions, to yield an all-in-focus image of the object. In an example of step 240, image combiner 189 combines in-focus surface-region images 159 to yield an all-in-focus image 199.

Figure 3:
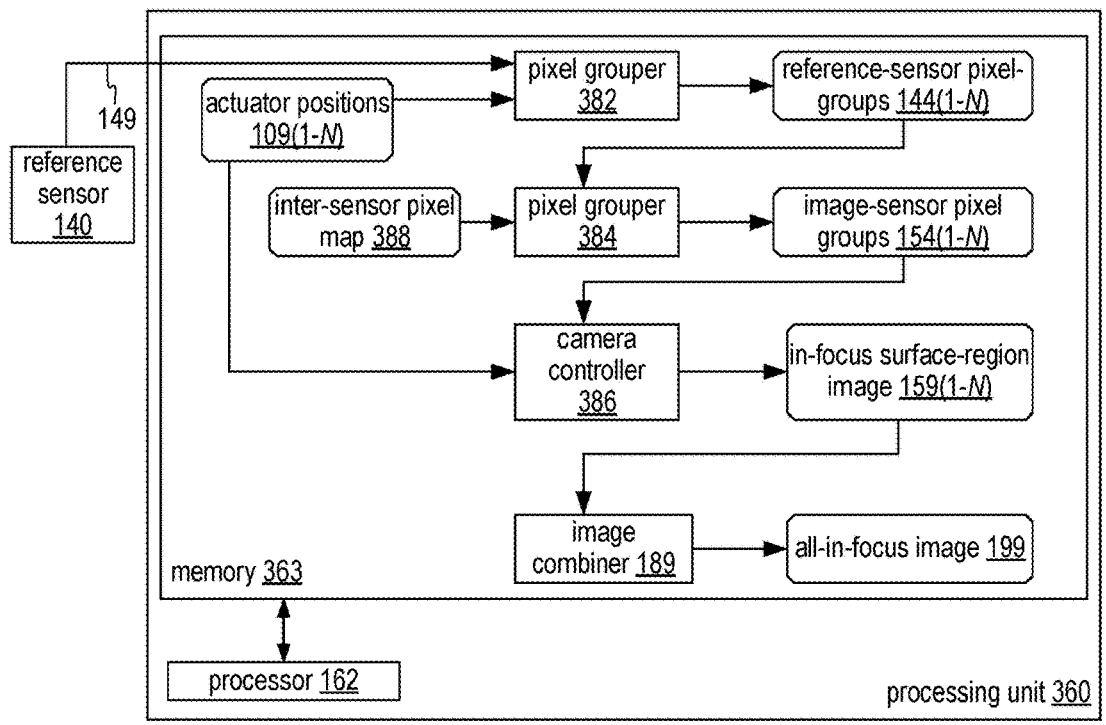
FIG. 3 is a schematic block diagram of a processing unit, which is an example of the processing unit of the all-in-focus imager FIG. 1.

FIG. 3 is a schematic block diagram of a processing unit 360, which is an example of processing unit 160 of all-in-focus imager 100. Processing unit 160 includes processor 162 and a memory 363, which is an example of memory 163. Like memory 163, memory 363 stores at least one of actuator positions 109, reference-sensor pixel groups 144, image-sensor pixel groups 154, in-focus surface-ration images 159, image combiner 189, and all-in-focus image 199. Memory 363 also stores at least one of an inter-sensor pixel map 388, and additional computer-readable instructions: a pixel grouper 382, a pixel grouper 384, and a camera controller 386.

Inter-sensor pixel map 388 includes a location-based mapping of reference-sensor pixels 143 to image-sensor pixels 153. In embodiments, pixel array 143A has $M_y$ rows and $M_x$ columns, pixel array 153A has $N_y$ rows and $N_x$ columns. Each reference-sensor pixel 143 has a respective pixel coordinate $(p_y, p_x)$ and a respective normalized pixel coordinate $(p_y/M_y, p_x/M_x)$, and each pixel 153 has a respective pixel coordinate $(q_y, q_x)$ and a respective normalized pixel coordinate $(q_y/N_y, q_x/N_x)$. In embodiments, inter-sensor pixel map 388 is a look-up table that (a) maps row $p_y$ of pixel array 143A to row $q_y$ of image-sensor pixel array 153A and (b) maps column $p_x$ of reference-sensor pixel array 143A to column $q_x$ image-sensor pixel array 153A, where $q_y$ and $q_x$ are the integers closest to respective quotients $$\frac{p_y N_y}{M_y} \text{ and } \frac{p_x N_x}{M_x}.$$

Figure 4:
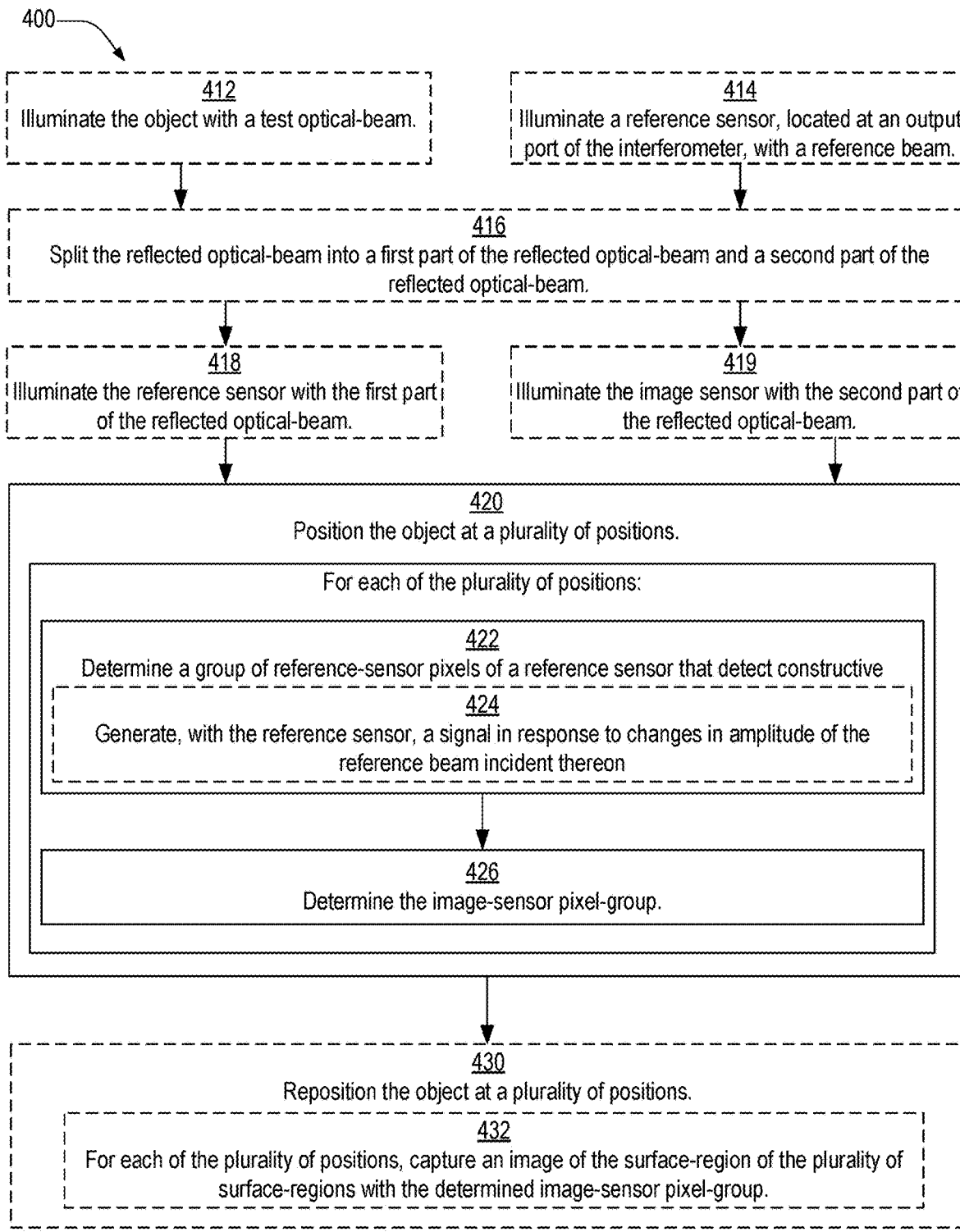
FIG. 4 is a flowchart illustrating a method determining a plurality of surface-regions of the object of the method of FIG. 2.

In embodiments, step 210 of method 200 includes utilizing optical interferometry to determine the image-sensor pixel group. For example, step 210 may include a method 400 (see FIG. 4). In embodiments, method 400 is implemented by processor 162 executing computer-readable instructions stored in memory 363. Method 400 includes steps 420, 422, and 426. In embodiments, method 400 also includes at least one of steps 412, 414, 416, 418, 419, and 430.

Step 412 refers to terms introduced in step 210, which include the plurality of surface-regions, the test optical beam, the reflected optical-beam, and the plurality of surface-regions. Step 412 includes illuminating an object with a test optical-beam. The test optical-beam propagates along a test-arm of an interferometer. The plurality of surface-regions collectively reflects the test optical-beam as the reflected optical-beam having a plurality of reflected-beam regions each corresponding to one of the plurality of surface-regions. In an example of step 412, test-optical beam 123 illuminates object 170. Surface regions 174 reflect test-optical beam 123 as reflected test-beam 124.

Step 414 includes illuminating a reference sensor, located at an output port of the interferometer, with the reference beam propagating from a reference mirror of the interferometer. The reference sensor includes a plurality of reference-sensor pixels. In an example of step 414, reference beam 134 illuminates reference sensor 140.

Step 416 includes splitting the reflected optical-beam into the first part of the reflected optical-beam and a second part of the reflected optical-beam. In an example of step 416, beamsplitter 117 splits reflected test-beam 124 into optical beams 126 and 125, which are the first part and second part of the reflected optical beam, respectively.

Step 418 includes illuminating the reference sensor with the first part of the reflected optical-beam, in which each of the plurality of reference-sensor pixels is illuminated by a respective one of the plurality of reflected-beam regions. In an example of step 418, beamsplitter 114 transmits optical beam 126 as detected test-beam 127, which illuminates reference sensor 140. Each pixel of the plurality of reference-sensor pixels 143 is illuminated by a respective one of a plurality of regions of detected test-beam 127 reflected by a respective one of surface regions 174.

Step 419 includes illuminating the image sensor with the second part of the reflected optical-beam such that each of the plurality of image-sensor pixels is illuminated by a respective one of the plurality of reflected-beam regions, and is therefore mapped to the one of the plurality of reference-sensor pixels illuminated by the respective one of the plurality of reflected-beam regions. In an example of step 419, beam 125 illuminates image sensor 152. Each of image-sensor pixels 153 is illuminated by a respective one of the plurality of regions of beam 125. Accordingly, each image-sensor pixel 153 illuminated by part of beam 125 reflected by surface region 174(k) is mapped to a reference-sensor pixel illuminated by a region of detected test-beam 127 reflected by surface region 174(k), so as to map surface region 174(k) to a corresponding image-sensor pixel group 154(k).

Step 420 includes positioning the object at a plurality of positions along an axis parallel to the test optical-beam. In an example of step 420, actuator 108 positions object 170 at actuator positions 109(1-N) along an axis parallel to test-optical beam 123. At each of the plurality of positions, a different one of object planes 177 is closest to—coplanar with, for example—in-focus object plane 157.

Steps 422 and 426 are executed for each of the plurality of positions of step 420. Step 422 includes determining a group of reference-sensor pixels, of the plurality of reference-sensor pixels, that detect interference between the reference beam and the first part of the reflected optical-beam reflected by one surface-region of the plurality of surface regions. In an example of step 422, k is an integer in the range of 1 to M, and pixel grouper 382 determines reference-sensor pixel group 144(k) from sensor output 149 from reference sensor 140 when actuator 108 is at actuator position 109(k). Pixel group 144(k) includes reference-sensor pixels 143 that detect interference between reference beam 134 and part of detected test-beam 127 reflected by surface region 174(k).

In embodiments, step 422 includes step 424, which includes generating, with the reference sensor, a signal in response to changes in amplitude (e.g., optical power or irradiance) of a recombined beam incident on the reference sensor and composed of the reference beam and the first part of the reflected optical-beam. In an example of step 424, reference sensor 140 is an event-based vision sensor that generates sensor output 149(k) at a plurality of reference-sensor pixels 143 corresponding to a reference-sensor pixel group 144(k) in response to changes in amplitude of recombined beam 129.

Step 426 includes determining the image-sensor pixel group as a plurality of pixels of the image sensor illuminated by a second part of the reflected optical beam reflected by the one surface-region. In an example of step 426, pixel grouper 384 determines image-sensor pixel group 154(k) from reference-sensor pixel group 144(k) and inter-sensor pixel map 388.

Step 430 includes repositioning the object at each of the plurality of positions. In an example of step 430, actuator 108 repositions object 170 at actuator of positions 109(1-N) along an axis parallel to the z axis.

In embodiments, step 430 includes a step 432. Step 432 includes, at each of the plurality of positions, capturing an image of the surface-region of the plurality of surface-regions with the determined image-sensor pixel group. In an example of step 432, camera controller 386 controls camera 150 to capture, at each of the plurality of positions 109(k) and with image-sensor pixel group 154(k), k={1, 2, ..., N}, in-focus surface-region image 159(k) of surface region 174 (k). Step 432 may also include illuminating, with flash 178 for example, the plurality of surface-regions when capturing the image thereof.

In step 432, camera 150 may capture an image with more than one image-sensor pixel group 154. In such instances, camera 150 and/or processing unit 160 extracts in-focus surface-region image 159(k) from the captured image. In embodiments, the captured image includes pixel values from all pixels 153, such that processing unit 160 need not control camera 150 to capture images with a subset of pixels 153 determined by image-sensor pixel groups 154(k).

Figure 5:
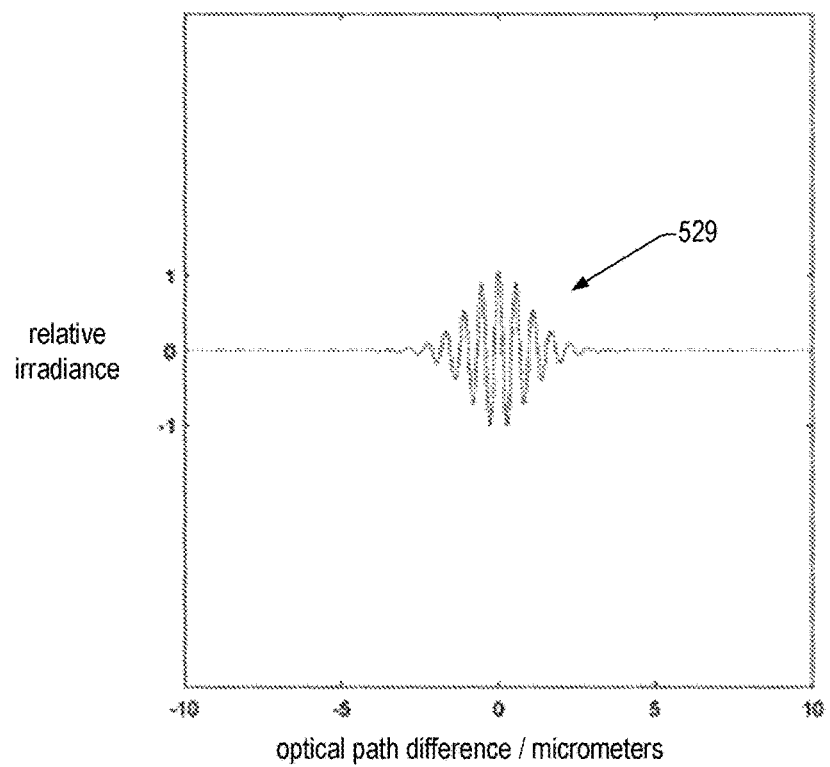
FIG. 5 is a graphical representation of example interference fringes detected by all-in-focus imager FIG. 1.

FIG. 5 illustrates an example of interference fringes 529 of recombined beam 129 detected by reference-sensor pixels 143 of reference sensor 140 as a function of an optical path difference between the test arm and the reference arm of interferometer 102. Interference fringes 529 result from interference between beams 127 and 134. In this example, the coherence length of light beam 121 is approximately ten micrometers. Reference-sensor pixels 143 of a reference-sensor pixel group 144(k) detects interference from surface-region 174(k) when actuator 108 is at actuator position 109(k). That is, the optical path difference between the test arm and reference arm of interferometer 102 are equal in regions of recombined beam 129 corresponding to regions of reference beam 134 originating at surface-region 174(k).

Figure 6:
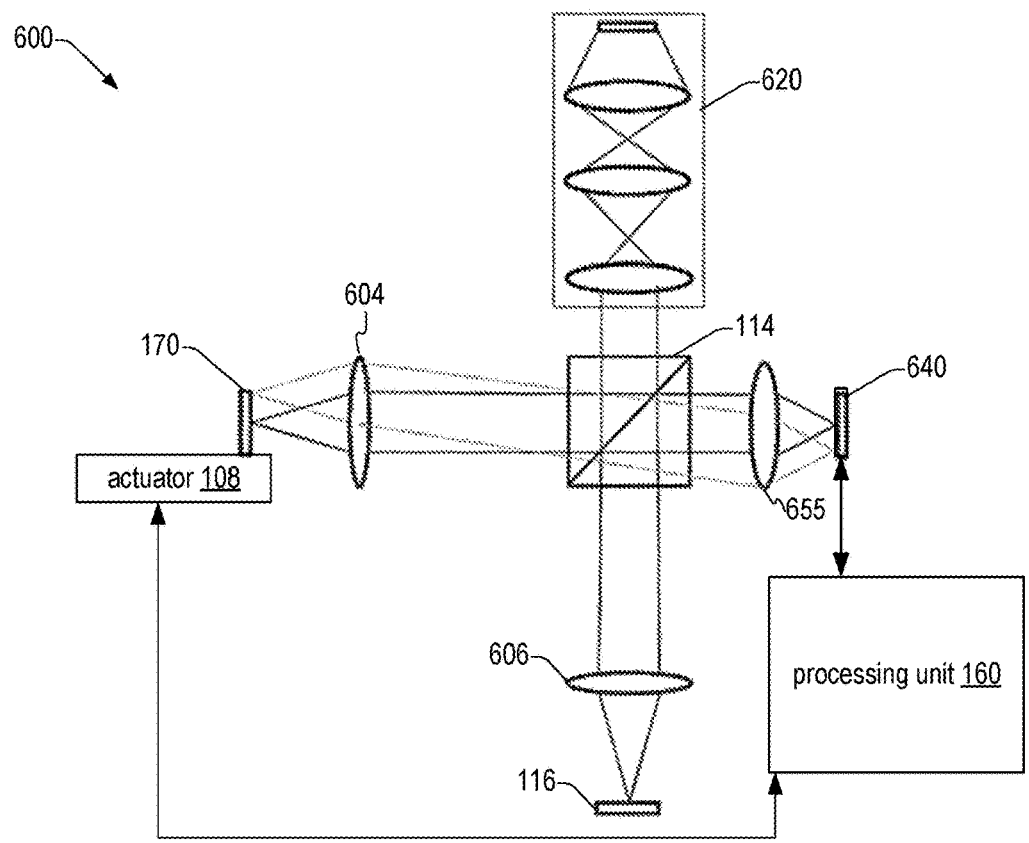
FIG. 6 is a schematic block diagram of an all-in-focus imager, which is an example of the all-in-focus imager of FIG. 1.

FIG. 6 is a schematic block diagram of an all-in-focus imager 600, which is an example of all-in-focus imager 100, FIG. 1, where a single sensor functions as both reference sensor 140 and image sensor 152. All-in-focus imager 600 is a modification of all-in-focus imager 100 in which both beamsplitter 117 and camera 150 are removed and a reference sensor 640 replaces reference sensor 140. All-in-focus imager 600 includes a light source 620, which is an example of light source 120. In embodiments, reference sensor 640 is identical to reference sensor 140, and may be an event-based image sensor. All-in-focus imager 600 also includes a lens 655, which is an example of lens 155 and is configured to form an image of surface regions 174 of object 170 depending on position 109 of actuator 108. In embodiments, all-in-focus imager 600 includes at least one of beam-shaping optical element 604 and beam-shaping optical element 606.

In embodiments, all-in-focus imager 600 includes processing unit 160. Method 200 may be implemented within one or more aspects of all-in-focus imager 600. In embodiments, method 200 is implemented by processor 162 executing computer-readable instructions stored in memory 163.

Combinations of Features

Features described above, as well as those claimed below, may be combined in various ways without departing from the scope hereof. The following enumerated examples illustrate some possible, non-limiting combinations.

(A1) A method for all-in-focus imaging of an object includes, for each of a plurality of surface-regions of the object, determining a corresponding image-sensor pixel group of a camera illuminated by light propagating from the surface-region of the object via a lens of the camera. The method also includes, after the step of determining and for each surface-region: (i) changing a distance between the object and the lens such that the surface region intersects the in-focus object-plane and the lens forms an in-focus surface-region image on the corresponding image-sensor pixel group; (ii) capturing, with the corresponding image-sensor pixel group, the in-focus surface-region image of the surface-region; and (iii) combining a plurality of in-focus surface-region images, obtained by performing said capturing for each of the plurality of surface-regions, to yield an all-in-focus image of the object.

(A2) In the method (A1), at least one of the image-sensor pixel groups may be discontiguous.

(A3) In any of methods (A1) and (A2), changing the distance may include moving the object.

(A4) In any of methods (A1)-(A3), a light-sensing plane of the camera may be located at an image-distance from the lens, and in the step of capturing, a focal length of the lens, a distance between the in-focus object-plane and the lens, and the image-distance may collectively satisfy the Gaussian lens formula.

(A5) Any of methods (A1)-(A4) may utilize optical interferometry to perform the step of determining the image-sensor pixel group.

(A6) In method (A5), each pixel group may include a respective plurality of image-sensor pixels, and determining the image-sensor pixel group may include at least one of steps (A7.1), (A7.2), and (A7.3). Step (A7.1) includes positioning the object at a plurality of positions along an axis parallel to a test optical-beam propagating along a test-arm of an interferometer and illuminating the object such that the object reflects the test optical-beam as a reflected optical-beam. Step (A7.2) includes, for each of the plurality of positions, determining a group of reference-sensor pixels, of a reference sensor located at an output port of the interferometer, that detect interference between a reference beam and a first part of the reflected optical-beam reflected by one surface-region of the plurality of surface regions. Step (A7.3) includes determining the image-sensor pixel group as a plurality of pixels of the image sensor illuminated by a second part of the reflected optical beam reflected by the one surface-region.

(A7) Method (A6) may further include at least one of steps (A7.1)-(A7.5). Step (A7.1) includes illuminating the object with the test optical-beam. The plurality of surface-regions reflect the test optical-beam as the reflected optical-beam having a plurality of reflected-beam regions each corresponding to one of the plurality of surface-regions. Step (A7.2) includes illuminating a reference sensor, located at an output port of the interferometer, with the reference beam propagating from a reference mirror of the interferometer. The reference sensor includes a plurality of reference-sensor pixels. Step (A7.3) includes splitting the reflected optical-beam into the first part of the reflected optical-beam and a second part of the reflected optical-beam. Step (A7.4) includes illuminating the reference sensor with the first part of the reflected optical-beam such that each of the plurality of reference-sensor pixels is illuminated by a respective one of the plurality of reflected-beam regions. Step (A7.5) includes illuminating the image sensor with the second part of the reflected optical-beam such that each of the plurality of image-sensor pixels is illuminated by a respective one of the plurality of reflected-beam regions, and is therefore mapped to the one of the plurality of reference-sensor pixels illuminated by the respective one of the plurality of reflected-beam regions.

(A8) Any of methods (A6) and (A7) may further include, for each of the plurality of positions: repositioning the object at each the plurality of positions and, at each of the plurality of positions, capturing an image of the surface-region of the plurality of surface-regions with the determined image-sensor pixel group.

(A9) In any of methods (A6)-(A8), the step of determining a group of reference-sensor pixels may include generating, with the reference sensor, a signal in response to a change in amplitude of a recombined beam thereon composed of the reference beam and the first part of the reflected optical-beam.

(A10) In any of methods (A1)-(A9), all locations within each surface region may be closest to a same respective object plane of a plurality of object planes each displaced from and parallel to an in-focus object-plane of the camera.

(A11) In method (A10), a separation between adjacent object planes of the plurality of object planes may be greater than or equal to a depth of field of the camera.

(A11) In any of methods (A10) and (A11), a separation between adjacent object planes of the plurality of object planes may be greater than or equal to a coherence length of the test optical-beam.

(B1) An all-in-focus imager includes a camera, an interferometer, a second beamsplitter, and an actuator. The camera includes an image sensor. The interferometer includes a reference sensor having a plurality of reference-sensor pixels, a reference mirror terminating a reference arm of the interferometer, and a first beamsplitter. The first beamsplitter is configured to split, at a first beam-splitting interface, an input light beam into (i) a test optical-beam propagating from the first beam-splitting interface to an object, such that the object terminates a test arm of the interferometer and reflects the test optical-beam as a reflected optical-beam, and (ii) a reference beam propagating from the first beam-splitting interface to the reference mirror and from the reference mirror to the reference sensor. The second beamsplitter is configured to direct (i) a first part of the reflected optical-beam to the reference sensor and (ii) a second part of the reflected optical-beam to the camera. The actuator is configured to change a length of the test arm by moving the object.

(B2) In imager (B1), an optical path length between a second beam-splitting interface of the second beamsplitter and the first beam-splitting interface may be equal to an optical path length between the second beam-splitting interface and a lens of the camera.

(B3) In either of imagers (B1) and (B2), the second beamsplitter may be between the first beamsplitter and a termination of the test arm, and be configured to transmit the first part of the reflected optical-beam and reflect the second part of the reflected optical-beam.

(B4) In either of imagers (B1) and (B2), the second beamsplitter may be between the camera and the first beamsplitter, and be configured to reflect the first part of the reflected optical-beam and transmit the second part of the reflected optical-beam.

(B5) Any of imagers (B1)-(B4) may further include a light source configured to generate the input light beam.

(B6) In any of imagers (B1)-(B5), the reference sensor may be an event-based vision sensor.

(B7) Any of imagers (B1)-(B6) may further include a processor and a memory. The processor is communicatively coupled to the camera, the reference sensor, and the actuator. The memory stores non-transitory computer-readable instructions that, when executed by the processor, control the processor to control the actuator to vary the length of the test arm.

(B8) Any of imagers (B1)-(B6) may further include a processor and a memory. The processor is communicatively coupled to the camera, the reference sensor, and the actuator. The memory stores non-transitory computer-readable instructions that, when executed by the processor, control the processor to execute any of the methods (A1)-(A11).

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. A method for all-in-focus imaging of an object, comprising:
   for each of a plurality of surface-regions of the object, determining a corresponding image-sensor pixel group of a camera illuminated by light propagating from the surface-region of the object via a lens of the camera;
   after the step of determining and for each surface-region:
      changing a distance between the object and the lens such that the surface region intersects an in-focus object-plane of the camera and the lens forms an in-focus surface-region image on the corresponding image-sensor pixel group,
      capturing, with the corresponding image-sensor pixel group, the in-focus surface-region image of the surface-region; and
   combining a plurality of in-focus surface-region images, obtained by performing said capturing for each of the plurality of surface-regions, to yield an all-in-focus image of the object.

2. The method of claim 1, at least one of the image-sensor pixel groups being discontiguous.

3. The method of claim 1, changing the distance comprising moving the object.

4. The method of claim 1, a light-sensing plane of the camera being located at an image-distance from the lens, and in the step of capturing, a focal length of the lens, a distance between the in-focus object-plane and the lens, and the image-distance collectively satisfying the Gaussian lens formula.

5. The method of claim 1, further comprising utilizing optical interferometry to perform the step of determining the image-sensor pixel group.

6. The method of claim 4, each pixel group including a respective plurality of image-sensor pixels, and determining the image-sensor pixel group comprising:
   positioning the object at a plurality of positions along an axis parallel to a test optical-beam propagating along a test-arm of an interferometer and illuminating the object such that the object reflects the test optical-beam as a reflected optical-beam; and
   for each of the plurality of positions:
      determining a group of reference-sensor pixels, of a reference sensor, located at an output port of the interferometer, that detect interference between a reference beam and a first part of the reflected optical-beam reflected by one surface-region of the plurality of surface regions; and
      determining the image-sensor pixel group as a plurality of pixels of the image sensor illuminated by a second part of the reflected optical beam reflected by the one surface-region.

7. The method of claim 6, further comprising:
   illuminating the object with the test optical-beam, the plurality of surface-regions reflecting the test optical-beam as the reflected optical-beam having a plurality of reflected-beam regions each corresponding to a one of the plurality of surface-regions;
   illuminating a reference sensor, located at an output port of the interferometer, with the reference beam propagating from a reference mirror of the interferometer, the reference sensor including a plurality of reference-sensor pixels;
   splitting the reflected optical-beam into the first part of the reflected optical-beam and a second part of the reflected optical-beam;
   illuminating the reference sensor with the first part of the reflected optical-beam, each of the plurality of reference-sensor pixels being illuminated by a respective one of the plurality of reflected-beam regions; and
   illuminating the image sensor with the second part of the reflected optical-beam, each of the plurality of image-sensor pixels being illuminated by a respective one of the plurality of reflected-beam regions, and therefore being mapped to the one of the plurality of reference-sensor pixels illuminated by the respective one of the plurality of reflected-beam regions.

8. The method of claim 6, further comprising, for each of the plurality of positions:
   repositioning the object at each the plurality of positions; and, at each of the plurality of positions,
   capturing an image of the surface-region of the plurality of surface-regions with the determined image-sensor pixel group.

9. The method of claim 6, the step of determining a group of reference-sensor pixels comprising generating, with the reference sensor, a signal in response to a change in amplitude of a recombined beam thereon composed of the reference beam and the first part of the reflected optical-beam.

10. The method of claim 6, all locations within each surface region being closest to a same respective object plane of a plurality of object planes each displaced from and parallel to an in-focus object-plane of the camera, a separation between adjacent object planes of the plurality of object planes being greater than or equal to a coherence length of the test optical-beam.

11. The method of claim 1, all locations within each surface region being closest to a same respective object plane of a plurality of object planes each displaced from and parallel to an in-focus object-plane of the camera.

12. The method of claim 11, a separation between adjacent object planes of the plurality of object planes being greater than or equal to a depth of field of the camera.

13. An all-in-focus imager comprising:
a camera including an image sensor;
an interferometer including:
   a reference sensor having a plurality of reference-sensor pixels,
   a reference mirror terminating a reference arm of the interferometer, and
   a first beamsplitter configured to split, at a first beam-splitting interface, an input light beam into (i) a test optical-beam propagating from the first beam-splitting interface to an object, such that the object terminates a test arm of the interferometer and reflects the test optical-beam as a reflected optical-beam, and (ii) a reference beam propagating from the first beam-splitting interface to the reference mirror and from the reference mirror to the reference sensor;
a second beamsplitter configured to direct (i) a first part of the reflected optical-beam to the reference sensor and (ii) a second part of the reflected optical-beam to the camera; and
an actuator configured to change a length of the test arm by moving the object.

14. The all-in-focus imager of claim 12, an optical path length between a second beam-splitting interface of the second beamsplitter and the first beam-splitting interface being equal to an optical path length between the second beam-splitting interface and a lens of the camera.

15. The all-in-focus imager of claim 12, the second beamsplitter being between the first beamsplitter and a termination of the test arm, and being configured to transmit the first part of the reflected optical-beam and reflect the second part of the reflected optical-beam.

16. The all-in-focus imager of claim 12, the second beamsplitter being between the camera and the first beamsplitter, and being configured to reflect the first part of the reflected optical-beam and transmit the second part of the reflected optical-beam.

17. The all-in-focus imager of claim 12, further comprising a light source configured to generate the input light beam.

18. The all-in-focus imager of claim 12, the reference sensor being an event-based vision sensor.

19. The all-in-focus imager of claim 12, further comprising
a processor communicatively coupled to the camera, the reference sensor, and the actuator; and
memory storing non-transitory computer-readable instructions that, when executed by the processor, control the processor to:
   control the actuator to vary the length of the test arm.

20. The all-in-focus imager of claim 12, further comprising:
a processor communicatively coupled to the camera, the reference sensor, and the actuator; and
memory storing non-transitory computer-readable instructions that, when executed by the processor, control the processor to:
   for each of a plurality of surface-regions of the object, determine a corresponding image-sensor pixel group of the camera illuminated by light propagating from the surface-region of the object via a lens of the camera, all locations within each surface region being closest to a respective object plane of a plurality of object planes each displaced from and parallel to an in-focus object-plane of the camera;
   after the step of determining and for each surface-region:
      change a distance between the object and the lens such that the surface region intersects the in-focus object-plane and the lens forms an in-focus surface-region image on the corresponding image-sensor pixel group,
      capture, with the corresponding image-sensor pixel group, the in-focus surface-region image of the surface-region; and; and
   combine a plurality of in-focus surface-region images, obtained by performing said capturing for each of the plurality of surface-regions, to yield an all-in-focus image of the object.

* * * * *